Feb. 2, 1954   S. H. EDGE ET AL   2,667,747
HYDRAULIC REDUCING VALVE
Filed March 27, 1950
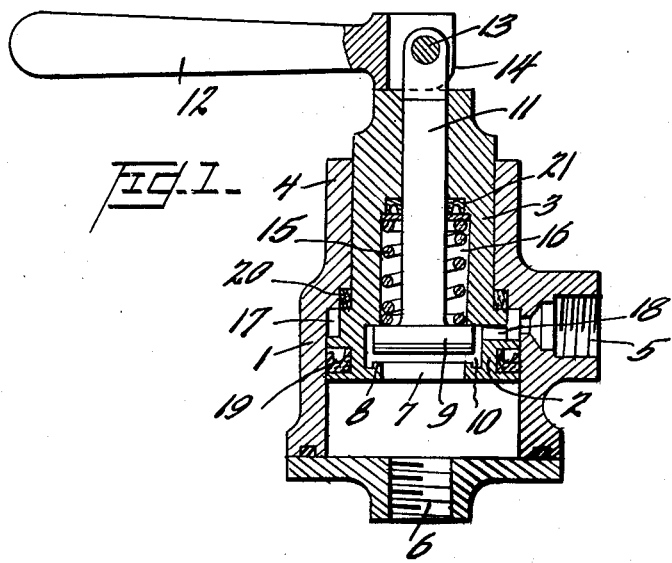
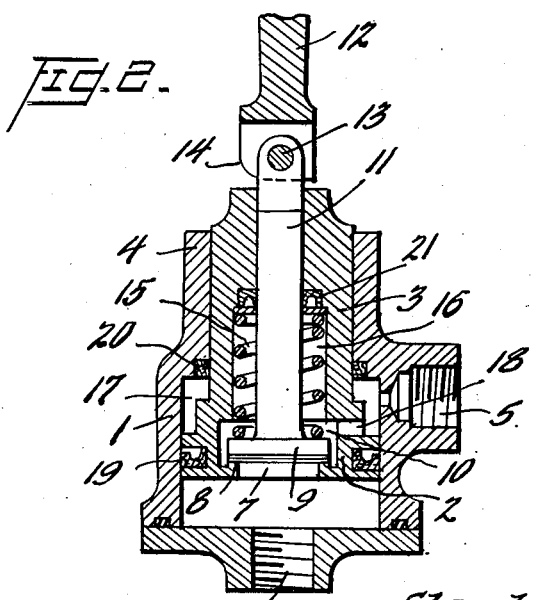
INVENTORS
Stanley H. Edge
Frederick L. Beet,
BY Norris & Bateman
ATTORNEYS Patented Feb. 2, 1954

2,667,747

UNITED STATES PATENT OFFICE 2,667,747

HYDRAULIC REDUCING VALVE

Stanley Howard Edge and Frederick Leslie Beet, Lincoln, England, assignors to Clayton Dewandre Company Limited, Lincoln, England, a British company Application March 27, 1950, Serial No. 152,153

Claims priority, application Great Britain March 28, 1949

7 Claims. (Cl. 60—54.6)

This invention relates to hydraulic reducing valves and has for its object to provide an improved and simplified valve of this character more particularly intended for use with a hydraulically controlled reaction valve in a trailer vehicle brake operating system.

According to the present invention a hydraulic reducing valve includes a housing, a piston and a valve element mounted therein, means being provided to cause the valve member to occupy either of two defined positions in one of which free fluid flow can take place through the valve housing and in the other position pressure on a reduced scale is transmitted by the piston.

Reference will now be made to the accompanying drawings which show a reducing valve constructed according to the invention and in which:

Figure 1 is a sectional elevation showing the valve components in the normal position, and Figure 2 is an elevation similar to Figure 1 but showing the components in the position to transmit pressure on a reduced scale.

In the construction illustrated the hydraulic reducing valve comprises a housing 1 wherein a piston 2 is movably mounted, the said piston having a cylindrical extension 3 of less diameter than the piston which is guided in a sleeve 4 forming part of the housing. The housing is also provided with a pressure inlet 5 situated above the piston and an outlet port 6 situated below the piston. In the lower face of the piston 2 is a circular opening 7 surrounded by an inwardly extending flange to provide a seating 8 for a disc valve member 9 movable within a shallow cylindrical valve chamber 10 formed within the body of the piston. The disc valve member 9 is mounted at the lower end of a stem 11 which projects through the piston extension 3 to the exterior thereof where it is provided with a handle 12 for manual operation. This handle is pivotally connected at 13 to the end of the valve stem 11 and in one position a cam face 14 formed on the handle engages the end of the piston extension 3 to hold the disc valve member 9 away from its seating 8 and compressing a spring 15 disposed immediately above the valve member 9 in a recess 16 surrounding the valve stem within the piston extension 3. This position of the parts is shown in Figure 1.

An annular chamber 17 surrounds the lower part of the piston extension 3 and this chamber is in permanent communication with the pressure inlet 5 and with a port 18 (or ports) in the piston extension leading to the valve chamber 10.

Leakage of fluid is prevented by a cup washer 19 mounted in a groove in the periphery of the piston 2; by a gland ring 20 mounted in a recess in the housing 1 and in permanent contact with the exterior of the piston extension 3; and by a cup washer 21 surrounding the valve stem 11 immediately above the spring 15.

In the operation of the valve above described the open position shown in Figure 1, is attained by moving the operating handle 12 to the position wherein the valve member 9 is held away from its seating 8. This allows pressure flow from the inlet 5 through the ports in the piston extension and the valve chamber to the outlet 6. When a reduction in pressure is required the operating handle is moved to its other position, shown in Figure 2, and the spring 15 is free to expand and maintain the valve member 9 on its seating thereby isolating the pressure inlet 5 from the outlet 6. Thereafter, the piston 2 can respond to pressure exerted upon its upper surfaces, that is the surfaces remote from the outlet 6. Because the area exposed to pressure is less than the area creating pressure on the side of the piston adjacent the outlet, the pressure on the outlet side will be reduced in the same proportion as the effective piston areas bear the one to the other.

The reducing valve of the present invention, as hereinbefore stated, is particularly applicable for use in the braking system of a trailer vehicle. For example, when a trailer is being operated unladen, or with light loads, it is obvious that it is undesirable to have the same retardation as when fully laden. By interposing the reducing valve in the pipe line between the source of fluid pressure and the reaction or other valve by which the brake operation is controlled, preferably at a point where it is readily accessible to the operator, a predetermined proportion of the retarding force is applied at the brake shoes of the vehicle when operating light.

An additional advantage of the invention is that the sealing components 19, 20 and 21 are located in such a manner that in any position of the valve stem 11, the pressure within the valve housing 1 tends to hold them in contact with their respective seatings.

We claim:

1. A hydraulic valve, comprising a cylindrical housing having a fluid pressure inlet thereto and an outlet therefrom, the housing being formed with a sleeve, a piston having two differential areas disposed within the housing between the inlet and outlet and having an extension slidably mounted within the sleeve of the housing, the piston being formed with an internal chamber and with a port in its lower surface opening into said chamber and through which the inlet normally communicates with the outlet, a stem slidably mounted within the piston extension and projecting externally thereof, a valve member located within said chamber of the piston and carried upon the inner end of said stem, hand-operable means connected to the externally projecting portion of the stem for moving the valve member relatively to the piston to open said port, and a spring acting constantly on the valve member and operative under control of the hand-operable means to urge the valve member from open position in which fluid is free to flow from the inlet to the outlet, into a seated position against said port and thereby interrupt the flow of fluid therethrough and cause fluid pressure from the inlet to act upon the smaller area of the piston to thereby move the piston to transmit pressure on a reduced scale to the outlet.

2. A hydraulic reducing valve, comprising a cylindrical housing having a fluid pressure inlet thereto and an outlet therefrom, the housing being formed with a sleeve, a piston having two differential areas disposed within the housing between the inlet and outlet and having an extension slidably mounted within the sleeve of the housing, the piston being formed with an internal chamber and with a port in its lower surface opening into said chamber and through which the inlet normally communicates with the outlet, a stem slidably mounted within the piston extension and projecting externally thereof, a valve member located within said chamber and carried upon the inner end of said stem, a coil spring surrounding said stem and urging the valve member toward said port, and manually operable means for retracting the valve member from said port independently of movement of the piston and holding the valve member retracted irrespective of movement of the piston to permit fluid to flow freely through said port from the inlet to the outlet, and for releasing the valve member for movement by said coil spring to seat against said port and to be maintained in seated position irrespective of movement of the piston and thereby interrupt flow of fluid through said port and cause the fluid pressure from the inlet to act upon said piston and thereby move the piston to transmit pressure on a reduced scale to the outlet.

3. A hydraulic valve as defined in claim 2, including sealing rings located around said valve stem, the base of said piston extension and said piston and held under all operating conditions in contact with their respecting cooperating surfaces by pressure of fluid within said housing.

4. A hydraulic reducing valve, comprising a housing having a fluid pressure inlet and a fluid pressure outlet, a piston having two differential areas movably mounted in the housing and having its smaller and larger areas in communication respectively with the inlet and outlet, a valve member carried by the piston and controlling communication between the inlet and outlet, spring means urging the valve member to closed position to interrupt communication between the inlet and outlet, and manually operable means for moving the valve member relatively to the piston and independently of movement thereof to set the valve valve member in open position and for maintaining the valve member in said open position irrespective of movement of the piston, and for releasing the valve member for movement by said spring means to closed position independently of movement of the piston and to be maintained in said closed position by said spring means irrespective of movement of the piston, the valve member being movable with the piston and, while in closed position, closing communication between the inlet and outlet and thereby interrupting the flow of fluid and causing fluid pressure from the inlet to act upon the smaller area of the piston and thereby move the piston to transmit pressure on a reduced scale to the outlet.

5. A hydraulic reducing valve, comprising a housing having a fluid pressure inlet thereto and an outlet therefrom, a piston having two differential areas movably mounted within the housing between the inlet and outlet and formed with a port through which the inlet normally communicates with the outlet, a spring-loaded valve member slidably mounted within the piston and adapted to seat against said port, and manually operable means for setting the valve member independently of movement of the piston in an open position in which fluid is free to flow from the inlet through said port to the outlet and for maintaining the valve member in said open position irrespective of movement of the piston, and for releasing the valve member to be urged by its spring-loading independently of movement of the piston into a position to close said port and to be maintained by its spring-loading in said closed position irrespective of movement of the piston to interrupt the flow of fluid through said port and cause fluid pressure from the inlet to act upon the smaller area of the piston and thereby move the piston to transmit pressure on a reduced scale to the outlet.

6. A hydraulic valve, comprising a cylindrical housing having a fluid pressure inlet thereto and an outlet therefrom, the housing having a sleeve, a piston having two differential areas disposed within the housing between the inlet and outlet and having an extension slidably mounted within said sleeve, the piston being formed with an internal chamber and with a port in its lower surface opening into said chamber and through which the inlet normally communicates with the outlet, a spring-loaded valve member located within said chamber, and manually operable means for setting the valve member independently of movement of the piston in an open position in which fluid is free to flow from the inlet to the outlet and for maintaining the valve member in said open position irrespective of movement of the piston, and for releasing the valve member to be urged by its spring-loading independently of movement of the piston into a seated position against said port to interrupt the flow of fluid therethrough and cause fluid pressure from the inlet to act upon the smaller area of the piston and thereby move the piston to transmit pressure on a reduced scale to the outlet.

7. A hydraulic reducing valve, comprising a housing having a fluid pressure inlet and a fluid pressure outlet, a differential piston mounted movably in the housing and having relatively smaller and larger areas in communication respectively with the inlet and outlet, and having an inter-communicating port between said areas, a valve member carried by the piston and movable relatively thereto to open or close said port, spring means urging the valve member to a seated position against said port, and manually operable means for setting the valve member independently of movement of the piston in an open position relatively to said port for free flow of fluid from the inlet to the outlet and for maintaining the valve member in said open position irrespective of movement of the piston, and for releasing the valve member to be urged by said spring means independently of movement of the piston into a seated position against said port to interrupt the flow of fluid therethrough and cause fluid pressure from the inlet to act upon the smaller area of the piston and thereby move the piston to transmit to the outlet a pressure which is inversely proportional to the differential of the areas of the piston.

STANLEY HOWARD EDGE.
FREDERICK LESLIE BEET.

References Cited in the file of this patent

UNITED STATES PATENTS

| Number | Name | Date |
|---|---|---|
| 2,144,020 | Hunt | Jan. 17, 1939 |
| 2,291,033 | Goepfrich | July 28, 1942 |
| 2,323,406 | Milhaupt | July 6, 1943 |
| 2,336,132 | Siegel | Dec. 7, 1943 |
| 2,367,115 | Goepfrich | Jan. 9, 1945 |
| 2,479,232 | Gunderson | Aug. 16, 1949 |
| 2,526,968 | Pontius | Oct. 24, 1950 |